(No Model.)
W. B. COLLINS.
WINDMILL.
No. 508,683.            Patented Nov. 14, 1893.
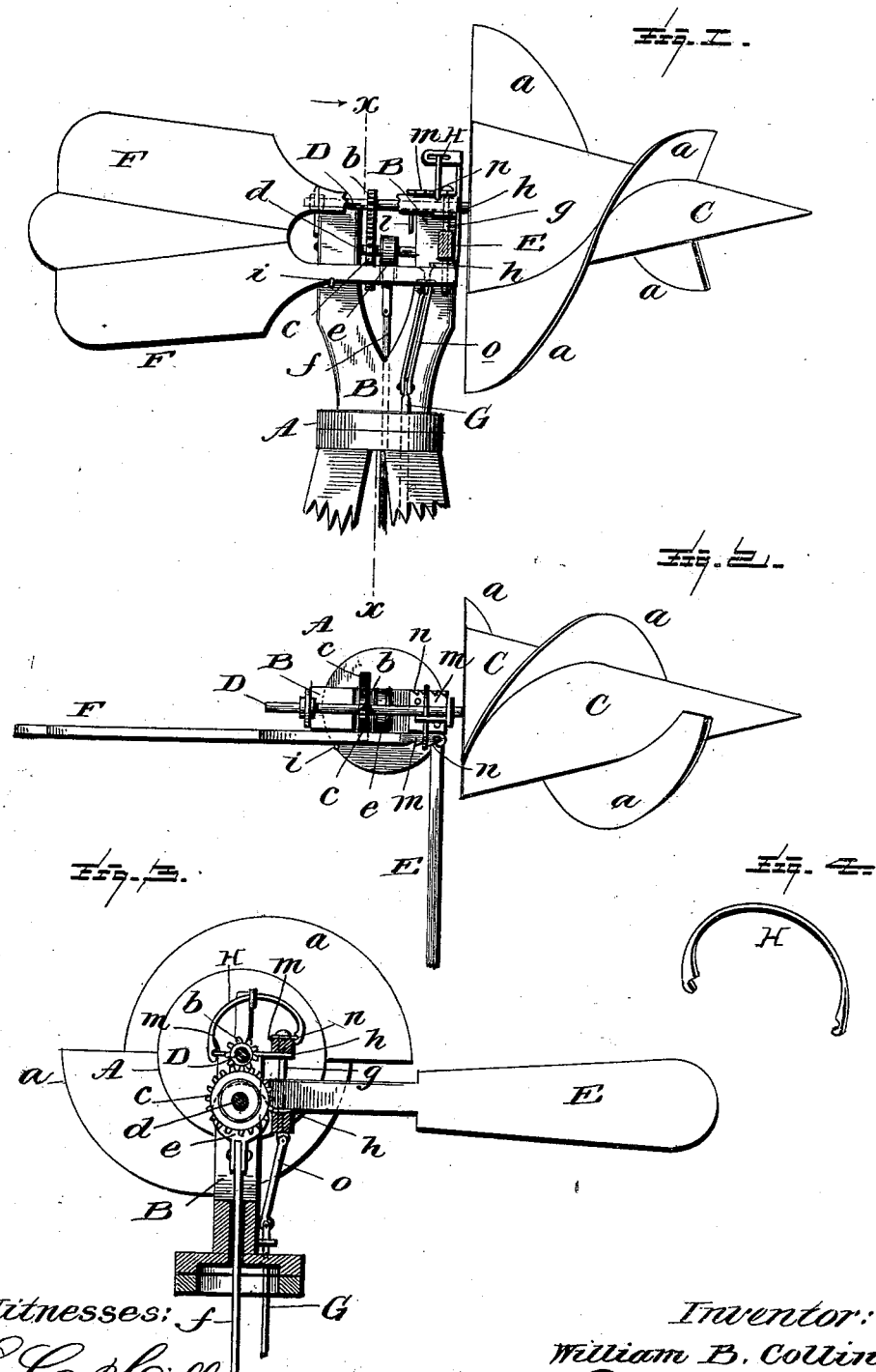
Witnesses:
L. C. Hills
Geo. H. Dick
Inventor:
William B. Collins
by E. Willasick
Attorney.

United States Patent Office.

WILLIAM B. COLLINS, OF SANTA ROSA, MISSOURI.

WINDMILL.

SPECIFICATION forming part of Letters Patent No. 508,683, dated November 14, 1893.

Application filed May 25, 1892. Serial No. 434,240. (No model.)

*To all whom it may concern:*

Be it known that I, WILLIAM B. COLLINS, a citizen of the United States, residing at Santa Rosa, in the county of Daviess and State of Missouri, have invented a new and useful Improvement in Windmills, of which the following is a specification.

This invention relates to certain new and useful improvements in wind mills; and it consists substantially in such features of construction, arrangement, and combinations of parts as will be hereinafter more particularly pointed out.

The object of the invention is to provide a simple and reliable form of wind mill for working the piston or sucker rod of pumps and similar classes of machinery, substantially as will be more fully hereinafter set forth, when taken in connection with the accompanying drawings, in which—

Figure 1 represents an elevation of a wind wheel or mill embodying my improvements. Fig. 2 is a top or plan view thereof. Fig. 3 is a vertical sectional view, taken on the line $x-x$ of Fig. 1, and Fig. 4 is a detailed perspective view of the spring which tends to hold the mill to the wind.

In carrying my invention into effect I provide the usual turn table upon which is mounted the vertical support in the top of which the main operating shaft has its bearings; the said shaft being geared to the eccentric rod which operates the vertically reciprocating piston or sucker rod of a pump or other similar contrivance. Suitably secured to a support, and projecting out beyond the wind wheel and at substantially right angles to the axis of rotation thereof is a rigid storm vane; and suitably mounted upon a pivotal support is a larger regulating vane with which is combined a spring which tends to hold it with a yielding force in rear of and parallel with the axis of the wind wheel. Combined with the said spring are means whereby its effective tension or force, while acting upon the regulating vane, can be varied in order to suit the varying requirements of the mill.

Referring to the drawings, A represents the usual turn-table and B, B two parallel vertical supports mounted thereon.

C represents the main operating wind wheel which, as shown, is conical and is surrounded by a spiral blade $a$.

D represents the main operating shaft having bearings in the top of the supports B, B, and connected with the wind wheel. This shaft is provided with a small pinion $b$ which meshes with a gear wheel $c$ carried on a rod or shaft $d$, which in turn carries the eccentric $e$, with which the piston or sucker rod $f$ of a pump or other similar contrivance is connected in the usual manner. The parts thus far described may be of usual or improved construction.

E designates the storm vane which extends rigidly out at substantially right angles to the axis of the wind wheel; and F represents the larger swinging or regulating vane which is pivotally supported upon a shaft $g$ close in rear of the wind wheel. A hook or catch $i$ projects from one of the supports B and with it the swinging or regulating vane F can be made to engage when it is desired that the latter should be secured in line with the wind wheel so as to hold the latter into the wind so as to be acted upon by the full force of the same. The regulating vane can be released from the hook or catch $i$ in a manner to be presently described, and when so released it is necessary that it should be held with a yielding force in a position in rear of the wind wheel or else the storm vane will carry the parts of the apparatus around so that vanes E and F lie parallel to each other and with the wind wheel out of operative position. This yielding device which tends to hold the regulating vane in position to carry the wind wheel into the wind, consists of a spring H. This spring is of curved or bowed shape, and its ends are preferably slightly notched and have an interlocking engagement with the notched plate $m, m$, which are carried, one by the swinging regulating vane, and the other by one of the supports B. As will be understood this spring tends to draw the swinging vane F around so that it lies against the supports B and in line with the wind wheel. The plates $m$ are notched along their edges, as at $n, n$ and by changing the ends of the spring from one notch to another, the effective force thereof can be changed. This will be understood from the fact that when the spring is close to the pivot $g$ of the swinging vane it acts with less force than when it is farther therefrom.

The means whereby the swinging or regulating vane can be released from the catch or hook $i$ consist of a reciprocating rod G which extends from a point where it can be conveniently operated by the attendant upward through the turn-table, and a link or links $o$ connecting the reciprocating rod with the swinging vane, preferably by a swivel connection. By lifting or pushing upward upon the rod G the regulating vane will be carried upward sufficiently far to rise over the point of the hook or catch $i$. The inclination of the links $o$ is such that when they are moved upward the direction of the force which is imparted to the regulating vane is such as to cause it to be moved outward or away from the supports $b$ sufficiently far to clear the hook, when the vane can be allowed to fall again and will, in such case lie outside of the said hook and will be free to swing except so far as it is controlled by the tension of the spring H.

When the wind is light and steady the regulating vane can be made to engage with the hook or catch $i$ so that the wind wheel will be held into the wind and be operated with the full force of the latter. If however the wind should increase in force or become so variable as to endanger the mill, by reason of the regulating vane being held rigidly to the supports B and in rear of the wind wheel, the attendant should move the regulating vane away from or out of contact with the catch $i$, when the regulating vane will be free to swing and will be self adjusting. It will be understood that this results from the operation of the wind upon the storm vane E which, when the wind is strong, causes the wind wheel to be turned somewhat out of the wind, the spring H being expanded to permit this movement. Should the force of the wind decrease the spring carries the wind wheel back into the wind again, as will be understood.

Should it be desirable to stop entirely the operation of the wind wheel this can be done by removing the spring when the wind will carry the two vanes, E and F, alongside of each other with the wind wheel out of the wind and so that it will not be operated thereby.

It will be seen from the foregoing description that the mill which I have invented is simple in construction and effective in its operation and is of such a nature as not liable to easily get out of repair.

Having thus described my invention, what I claim, and desire to secure by Letters Patent, is—

1. In a wind mill, the combination of the wind wheel, the storm vane, the larger swinging regulating vane, and the bowed spring H interposed between the swinging vane and a fixed part of the mill, and tending to keep the swinging vane in line with the wind wheel and at substantially right angles to the storm vane, substantially as described.

2. In a wind mill, the combination of the wind wheel, the storm vane, the swinging regulating vane, the spring which tends to hold the regulating vane in line with the wind wheel, and connected therewith and with some fixed part of the mill, and the means for adjusting the points of connection of the said spring whereby its effect upon the regulating vane can be varied, substantially as set forth.

3. In a wind mill, the combination of the wind wheel, the storm vane, the larger swinging regulating vane, the notched plates $m, m$ carried, one by a fixed part of the mill, and the other by the regulating vane, the bowed spring H which engages with the said notched plates, and tends to hold the regulating vane in line with the wind wheel, the hook or catch $i$ which is adapted to hold the regulating vane in line with the wind wheel, and the means connected with the regulating vane whereby it can be released or disengaged from the said hook, substantially as set forth.

4. In a wind-mill, the combination of the notched plates, the swinging vane, and vertical operating rod, and the bowed or curved spring having its ends entering the notches of said plates, substantially as shown and for the purpose set forth.

In testimony whereof I affix my signature in presence of two witnesses.

WILLIAM B. COLLINS.

Witnesses:
  W. A. SHAW,
  C. R. SHAW.